UNITED STATES PATENT OFFICE.

JAMES M. HERRON, OF EAST ORANGE, NEW JERSEY, ASSIGNOR, BY MESNE ASSIGNMENTS, TO CEYLON COCOA & COFFEE COMPANY, A CORPORATION OF NEW YORK.

COFFEE PREPARATION.

No. 829,649.   Specification of Letters Patent.   Patented Aug. 28, 1906.

Application filed April 3, 1905. Serial No. 253,662.

*To all whom it may concern:*

Be it known that I, JAMES M. HERRON, a citizen of the United States, and a resident of Hyde Park, East Orange, in the county of Essex and State of New Jersey, have invented a new and useful Coffee Preparation; and in order that those skilled in the art may make and use my invention I give the following specification.

My invention relates to coffee preparations, and has for its object to produce a new preparation of coffee in a form which is readily available for various uses, and more particularly adapted for use by caterers, confectioners, pastry-makers, and the like.

In practice, as heretofore followed when caterers, confectioners, and others desired to avail themselves of coffee as a flavoring or ingredient in cakes, pastry, confectionery, ice-cream, or the like a decoction or infusion of the roasted ground coffee-berries was made in the usual way with boiling water and the liquor so obtained was employed for the purpose desired. This process of obtaining coffee for the uses above mentioned is cumbrous and involves the expenditure of considerable time and skill, since the flavor of the coffee is largely dependent upon the skilful making of the decoction. My invention is designed to obviate this long and cumbrous process of obtaining coffee for the uses mentioned by producing coffee, preferably in the form of tablets or cakes or powder, which may be directly used by caterers and confectioners, the cakes or tablets being readily melted to an entirely smooth liquid or semiliquid consistency, in which form it may be readily applied to the flavoring or coating of cakes, pastry, ice-cream, or the like.

In order to carry out my invention, I preferably take suitable amounts of the following ingredients in about the proportions given, to wit: one-half pound of roasted coffee, one-half pound of ripe raw cocoa-beans, and one-fourth pound of raw cocoa-butter. It will be understood that any desired quantity of the ingredients may be taken, according to the quantity of coffee preparation it is desired to make. The proportions given above are merely by way of example, it being understood that they may be varied without departing from the scope of my invention.

The ingredients in about the proportions given are all intimately and finely ground together, the grinding being carried on at a temperature sufficient to melt the cocoa-butter—for instance, at a temperature of from 100° to 115° Fahrenheit—and to an extent to produce a perfectly smooth fluid mass which will flow. The smooth fluid mass obtained as above described is then preferably run into molds of convenient size and allowed to solidify and harden. The result is hard solid cakes or tablets of coffee, which may be kept indefinitely and remain solid at ordinary temperature, but which may be readily rubbed down or converted into a perfectly smooth oily paste at a slight increase of temperature.

The raw cocoa-butter which I employ is the butter from raw or unroasted and ripe cocoa-beans and is distinguished from cocoa-butter which ordinarily comes into the market in that it has a higher melting-point and is free from the chocolate flavor which is present in the roasted beans. Cocoa-butter as ordinarily obtained in commerce is made from the roasted beans and has a lower melting temperature than the cocoa-butter from the raw beans, so that if employed for the purpose of my invention the resulting cake or tablet would not withstand indoor temperature, particularly in summer. The ordinary cocoa-butter made from the roasted beans also possesses the chocolate flavor, which would detract from and impair the flavor of the coffee in my preparation. A further important feature of my invention is the employment of ripe raw cocoa-beans as an ingredient. The ripe bean has a more pleasant flavor than the unripe beans, and the use of these beans raw has the effect of greatly improving the taste of the coffee by modifying or counteracting the harsh acrid flavor which coffee ordinarily possesses.

Cocoa-beans as brought into commerce contain always a greater or less proportion of unripe beans, the value and grade of any given lot of beans depending upon the greater or less proportion of unripe beans present in the lot.

While I have specified above the use of ripe beans as best illustrating my invention, it will be understood that both ripe and unripe beans may be employed for the purpose, as where the highest grade of product is not required.

While I have described my invention as more particularly adapted for use by confectioners, caterers, and the like, it will be understood it may also be used for making the beverage or for other purposes for which coffee is ordinarily employed.

Having thus described my invention, the following is what I claim as new therein and desire to secure by Letters Patent:

1. The herein-described coffee preparation consisting of intimate admixture of ground roasted coffee, raw cocoa-beans of commerce and raw cocoa-butter.

2. The herein-described article of manufacture, consisting of a coffee preparation, composed of an intimate admixture of ground roasted coffee, ground ripe raw cocoa-beans, and raw cocoa-butter.

3. A coffee preparation composed of an admixture of one part by weight of ground roasted coffee, one part by weight of ground ripe, raw cocoa-beans, and one-half part by weight of raw cocoa-butter, substantially as described.

JAMES M. HERRON.

Witnesses:
HENRY C. WORKMAN,
W. P. HAMMOND.